United States Patent [19]
Kachi et al.
[11] 3,887,274
[45] June 3, 1975

[54] FILM FRAME SELECTING APPARATUS FOR A PROJECTOR

[75] Inventors: Kenjiro Kachi, Aichi; Morio Takeichi, Inazawa; Yasumasa Nakamura, Nagoya; Yoichi Inomata, Anjo; Mitsuru Nakano, Toyota, all of Japan

[73] Assignee: Elmo Company, Limited, Nagoya, Japan

[22] Filed: Sept. 15, 1973

[21] Appl. No.: 289,328

[52] U.S. Cl. .................................. 353/26; 250/561
[51] Int. Cl. ...................... G03b 21/11; G03b 23/12
[58] Field of Search ................................ 353/25-27; 250/561, 557

[56] References Cited

UNITED STATES PATENTS

| | | | |
|---|---|---|---|
| 3,290,987 | 12/1966 | James | 353/26 |
| 3,538,313 | 11/1970 | Thomas | 353/26 |
| 3,708,677 | 1/1973 | Volk | 353/26 |
| 3,751,152 | 8/1973 | Rinehart | 353/26 |
| 3,757,091 | 9/1973 | Baker | 353/26 |

*Primary Examiner*—Richard E. Aegerter
*Assistant Examiner*—A. J. Mirabito
*Attorney, Agent, or Firm*—Donald Gunn

[57] ABSTRACT

A film frame selecting apparatus for a projector, which drives a strip of perforated film containing still or animated picture images recorded independently or sequentially, at an advancing velocity enabling animated picture reproduction, and which selects for reproduction a still image at a particular address on the film or a first frame of a particular animated picture sequence by comparing a signal from a comparison signal generator which generates a signal corresponding to a frame on the film and proportional to the film advancing velocity, with a signal to stop the film at a particular frame bearing the image to be projected.

11 Claims, 11 Drawing Figures

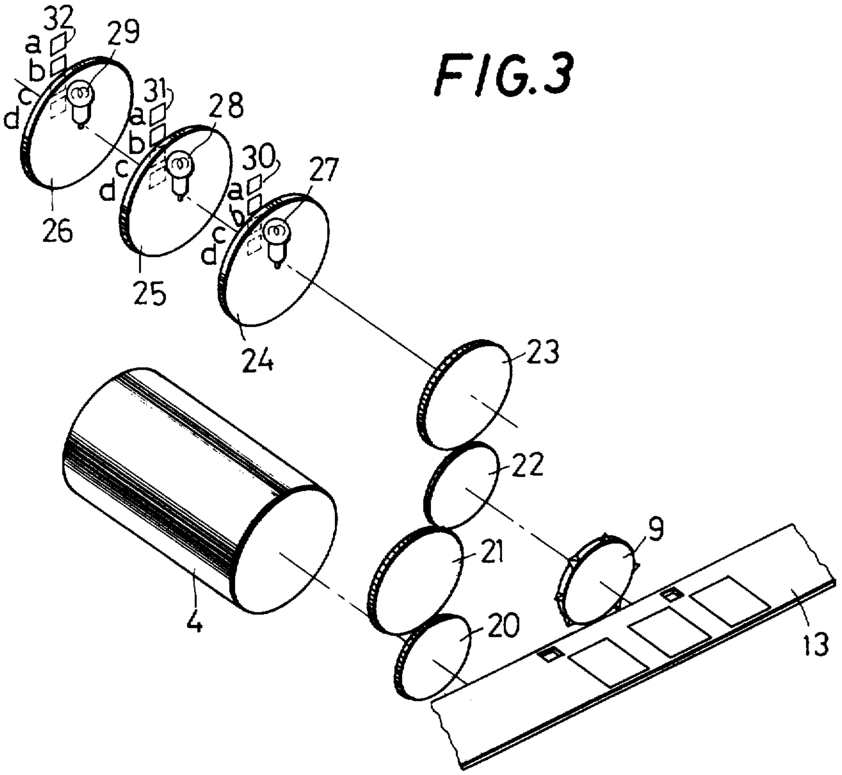
FIG.3
FIG.4a
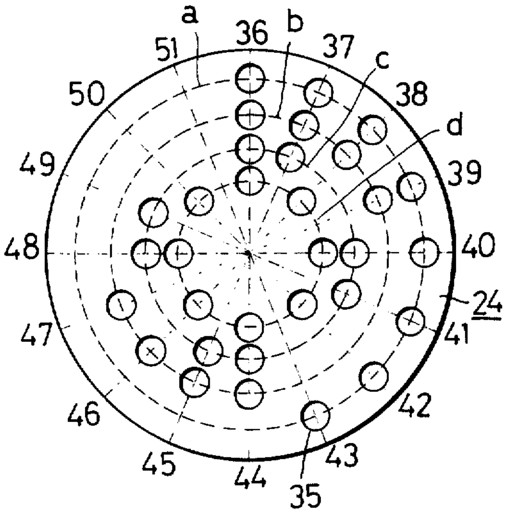
FIG.4b
| concentric circle / radial line | a | b | c | d |
|---|---|---|---|---|
| 36 | 0 | 0 | 0 | 0 |
| 37 | 0 | 0 | 0 | 1 |
| 38 | 0 | 0 | 1 | 0 |
| 39 | 0 | 0 | 1 | 1 |
| 40 | 0 | 1 | 0 | 0 |
| 41 | 0 | 1 | 0 | 1 |
| 42 | 0 | 1 | 1 | 0 |
| 43 | 0 | 1 | 1 | 1 |
| 44 | 1 | 0 | 0 | 0 |
| 45 | 1 | 0 | 0 | 1 |
| 46 | 1 | 0 | 1 | 0 |
| 47 | 1 | 0 | 1 | 1 |
| 48 | 1 | 1 | 0 | 0 |
| 49 | 1 | 1 | 0 | 1 |
| 50 | 1 | 1 | 1 | 0 |
| 51 | 1 | 1 | 1 | 1 |

FIG.5
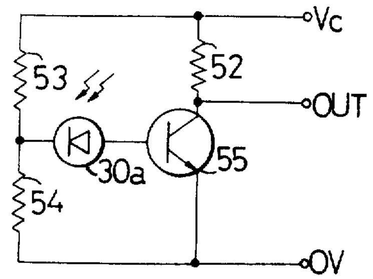
FIG.6
| | 30 | | | | 31 | | | | 32 | | | |
|---|---|---|---|---|---|---|---|---|---|---|---|---|
| | a | b | c | d | a | b | c | d | a | b | c | d |
| 0 | 0 | 0 | 0 | 0 | 0 | 0 | 0 | 0 | 0 | 0 | 0 | 0 |
| 1 | 0 | 0 | 0 | 1 | 0 | 0 | 0 | 1 | 0 | 0 | 0 | 1 |
| 2 | 0 | 0 | 1 | 0 | 0 | 0 | 1 | 0 | 0 | 0 | 1 | 0 |
| 3 | 0 | 0 | 1 | 1 | 0 | 0 | 1 | 1 | 0 | 0 | 1 | 1 |
| 4 | 0 | 1 | 0 | 0 | 0 | 1 | 0 | 0 | 0 | 1 | 0 | 0 |
| 5 | 0 | 1 | 0 | 1 | 0 | 1 | 0 | 1 | 0 | 1 | 0 | 1 |
| 6 | 0 | 1 | 1 | 0 | 0 | 1 | 1 | 0 | 0 | 1 | 1 | 0 |
| 7 | 0 | 1 | 1 | 1 | 0 | 1 | 1 | 1 | 0 | 1 | 1 | 1 |
| 8 | 1 | 0 | 0 | 0 | 1 | 0 | 0 | 0 | 1 | 0 | 0 | 0 |
| 9 | 1 | 0 | 0 | 1 | 1 | 0 | 0 | 1 | 1 | 0 | 0 | 1 |
| 10 | 1 | 0 | 1 | 0 | 1 | 0 | 1 | 0 | 1 | 0 | 1 | 0 |
| 11 | 1 | 0 | 1 | 1 | 1 | 0 | 1 | 1 | 1 | 0 | 1 | 1 |
| 12 | 1 | 1 | 0 | 0 | 1 | 1 | 0 | 0 | 1 | 1 | 0 | 0 |
| 13 | 1 | 1 | 0 | 1 | 1 | 1 | 0 | 1 | 1 | 1 | 0 | 1 |
| 14 | 1 | 1 | 1 | 0 | 1 | 1 | 1 | 0 | 1 | 1 | 1 | 0 |
| 15 | 1 | 1 | 1 | 1 | 1 | 1 | 1 | 1 | 1 | 1 | 1 | 1 |
FIG.7
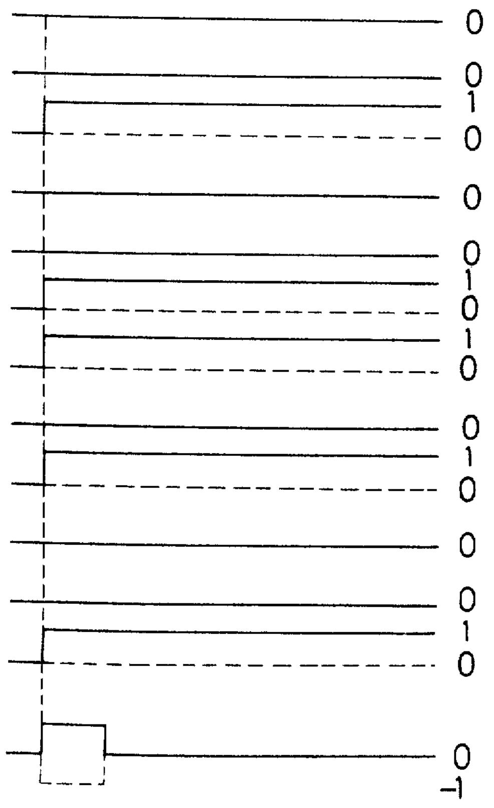
FIG.8
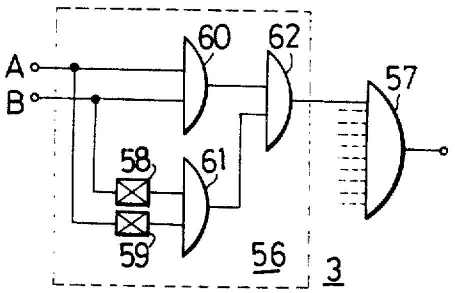

FILM FRAME SELECTING APPARATUS FOR A PROJECTOR

BACKGROUND OF THE INVENTION

This invention relates to film frame selecting or accessing apparatus for a projector, and more particularly, to an improved film frame selecting or accessing apparatus which selectively stops the film at a particular frame for presenting the image information required by the operator.

Various forms of apparatus of this type have hitherto been proposed for a number of applications. The simplest form of the apparatus thus known in the art is one found in a display machine. Such a display machine essentially comprises a strip of film bearing still or animated picture images or a combination of both, means for transporting the film, means for controlling the film transport means, an operating panel for this control means, and means for projecting the images. The operating panel contains a multiplicity of controls functionally associated with film transport to select the frames on the film. Controls are selectively operated to stop the film at a particular frame, depending on the information required by a user or viewer, so that a still image or animated picture images are projected on a screen automatically to furnish the viewer with the information which he needs.

Another form of the apparatus has been proposed for educational use. According to the apparatus for this particular type, the frames on the film contain, for example, questions which show the student whether his answer is correct or not, and give him further questions depending on his answer. After having tried to consider a proposed answer to the question, the student selectively operates a particular control to stop the film at the particular frame which he has selected, and project the information stored therein on a screen. Such apparatus has been satisfactorily used to provide a systematical educational or training aid to the student or trainee according to his ability.

It has also been proposed to use such apparatus in combination with an electronic computer for educational or training purposes. The operating panel for this type of apparatus contains controls only indicative of the "yes" and "no" answers to the questions contained on the film. The addresses of the frames containing various questions, and those of the frames containing the images to be presented on the screen depending on the answer by the student are stored in the computer. The computer does everything necessary to grade the student's answer, and selectively stop the film at a particular frame containing the image to be subsequently reproduced. Accordingly, the operator does not select various frames for reproduction of the information which he requires, but this is done in the computer by program or otherwise.

However, all these forms of apparatus known in the art have been unsatisfactory in certain respects. In particular, the apparatus previously known in the art has entirely relied on the codings records on the film itself, whether magnetically or otherwise, and as such, has required means for encoding the film at the time of exposure, as well as a complicated device for detecting the codings, which has resulted in a large increase in the cost of the apparatus. The cost is only one reason why the apparatus already available is not popular despite a high degree of utility of such apparatus for educational, training or display purposes.

SUMMARY OF THE INVENTION

According to this invention, a pulsed motor actuates a sprocket means adapted to engage the perforations in the film to thereby move the film through a viewing position. While the film is advanced at a speed enabling animated picture reproduction, such as found in a motion picture projection, the pulse motor also operates photoelectric means for generating signals as the frames on the film move through the viewing position. The signals generated by the photoelectric means are applied to a comparison circuit, which is also fed with signals generated by an electronic computer or operating panel. This circuit compares these two signals for coincidence at which time the motor stops the film at a particular frame containing the information needed. The photoelectric signal generating means is so devised as to establish a fixed operational relationship between the frames of the film and the signals generated by the means. This eliminates the need to encode the film with the marks or signs indicative of the positions of the frames. Therefore, the invention provides an improved selective film transport apparatus which is not only simpler in construction, but also very reliable and accurate in operation since the input signals to the comparison circuitry are generated internally and photoelectrically.

Since in operation, the film is advanced at a speed for animated picture reproduction, the apparatus of the invention may selectively be used for two purposes. A series of animated picture images stored on the film may be reproduced to project an animated sequence, or it is alternatively possible to stop the film at a particular frame wherever a photographic still image is preferred. Therefore, the invention permits the placing of the maximum amount of information effectively on a single roll of film by appropriately using some portions of the film for storing animated picture images, and the other portions for still images.

A further feature of the invention results from the use of a pulsed motor for driving the film transporting mechanism. When a coincidence signal is developed in the comparison circuitry, the motor is stopped at a particular frame on the film. The apparatus of this invention does not require any brake, clutch or other means for preventing movement of the film due to inertia upon deenergization of the drive means.

In accordance with another embodiment of the invention, there is provided additional circuitry including counter circuits to vary the frequency of the basic pulses generated by the photoelectric means for energizing the pulse motor, and thereby vary the speed of rotation of the motor in such a manner that the film may selectively be advanced at any speed including a slow-motion or a high speed. Furthermore, it is possible to connect the pulse motor directly to the film transporting means if an appropriate selection of the frequency of the basic pulses is available. This arrangement eliminates all the intermediate speed reduction means normally required between the drive motor and the film engaging means.

BRIEF DESCRIPTION OF THE DRAWINGS

FIG. 3 is a perspective view illustrating the positional relationship between the film drive mechanism and the mechanism of the comparison signal generating means;

FIG. 4*a* is a plan view illustrating a portion of the comparison signal generating means;

FIG. 4*b* is a table listing the photoelectric signals generated upon rotation of the discs included in the comparison signal generating means;

FIG. 5 is a circuit diagram illustrating a portion of the comparison signal generating means;

FIG. 6 is a table listing the output signals generated from the comparison signal generating means;

FIG. 7 is a view illustrating the wave forms of the output signals generated from the electronic computer or operating panel used in connection with invention;

FIG. 8 is a block diagram illustrating the comparison circuitry used in connection with the invention;

DESCRIPTION OF THE PREFERRED EMBODIMENT

Figures 1, 2:
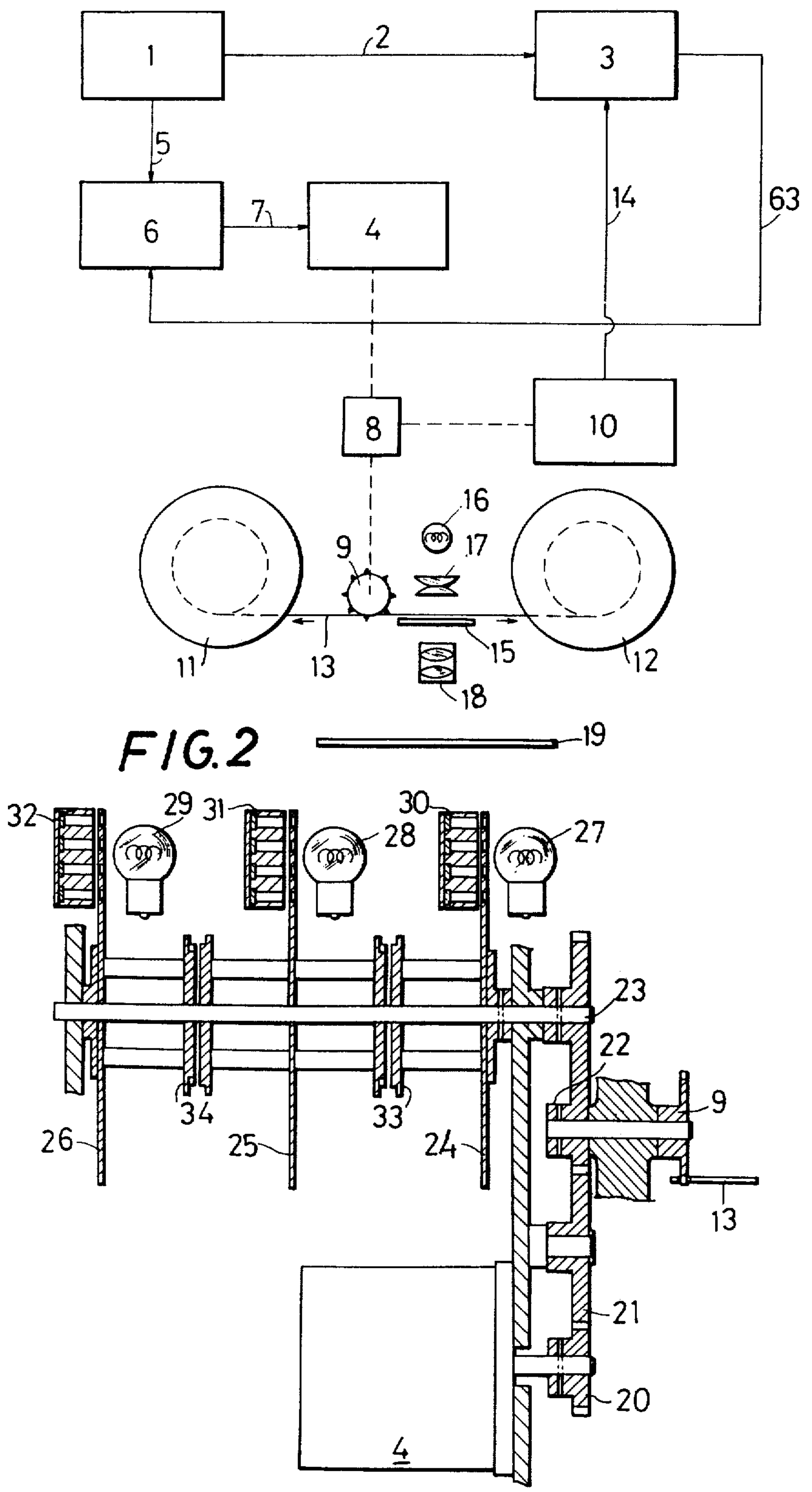
FIG. 1 is a schematic diagram, in block form, illustrating the general configuration of a preferred embodiment of this invention.
FIG. 2 is a side view illustrating the mechanism of comparison signal generating means used in connection with the invention.

Referring now to the drawings more particularly, there is shown in FIG. 1 means 1 selectively operable to generate a signal indicative of a particular frame, on film, containing the information needed by the operator or user of the apparatus. The means 1 may be a simple operating panel from which a particular frame on the film may be designated as desired by the operator. Alternatively, the means 1 may comprise an electronic computer adapted to encode therein the address of each frame on the film containing a still image or the first frame of each animated picture sequence, and the address of the frame next to be reproduced. In case the information recorded on the film is of the type requiring any judgment by the operator or user of the apparatus, the electronic computer evaluates his judgment. The means 1 will hereinafter be referred to as an electronic computer.

The electronic computer 1 generates a signal on a conductor 2 indicative of a particular frame containing the information required by the operator, and transmits it to a comparison circuit 3. At the same time, a signal on a conductor 5 indicative of the desired direction of rotation of a pulse motor 4 is generated by the electronic computer 1, and transmitted to a control means 6 for the motor 4. The signal 5 applied to the motor control means 6 triggers the pulse generating circuit therein, which in turn transmits pulses on a conductor 7 to the motor 4. The motor 4 is energized for rotation by an angle corresponding to the number of pulses 7 received. The rotation of the pulse motor 4 is transmitted through appropriate transmission means 8 to a sprocket 9 and a comparison signal generating means 10 to thereby actuate them. Accordingly, the sprocket 9 and the comparison signal generating means 10 are functionally associated with each other in a fixed operation relation.

The sprocket 9 moves a strip of film 13 by its teeth engaging a multiplicity of performations provided at equal intervals along one or both edges of the film, and the film 13 is transported between a pair of reels 11 and 12 without developing any significant slack. Upon coincidence of a signal on a conductor 14 from the comparison signal generating means 10 and the signal on the conductor 2 received from the computer 1, a coincidence signal is developed in the comparison circuit, whereupon the motor 4 is deenergized to stop the film 13 at the frame selected at the electronic computer 1 with the frame aligned with a viewing position or aperture 15 provided intermediate the two reels 11 and 12. A lamp 16 is positioned between the lamp 16 and the viewing aperture 15, and a projection lens system 18 is positioned on the opposite side of the aperture 15 from the lamp 16. Light is directed from the lamp 16 through the lens 17, the film 13, the viewing aperture 15 and the lens 18 to project the image of the selected frame to a screen 19.

The comparison signal generating means 10 generates the signal on the conductor 14 indicative of each of the frames on the film 13 as the film 13 is moved by the sprocket 9 past the viewing position 15. The signal is transmitted to the comparison circuits and compared with the signal received from the electronic computer 1.

Referring to FIG. 2 and FIG. 3, the rotation of the pulse motor 4 is transmitted through a series of gears 20, 21 and 22 to the sprocket 9 to thereby actuate the sprocket 9 and cause the film 13 to move past the viewing aperture 15 between the reels 11 and 12. In addition to the gears 20, 21 and 22, the transmission means 8 includes another gear 23 which is engaged with the gear 22 which actuates the comparison signal generating means 10.

The comparison signal generating means 10 comprises three discs 24, 25 and 26 preferrably identical in form, each having a plurality of holes therethrough, three lamps 27, 28 and 29 positioned respectively on one side of the discs 24, 25 and 26, three groups of photoelectric elements 30*a* through 30*d*, 31*a* through 31*d*, and 32*a* through 32*d* positioned respectively on the opposite side of the discs from the lamps 27, 28 and 29, and a pair of means for shifting the unit of a figure, one of which is positioned between the discs 24 and 25, and designated by the numeral 33, while the second shifting mechanism 34 is positioned between the discs 25 and 26. On completion by the first disc 24 of a full rotation, the second disc 25 is rotated by one step, and similarly, upon eventual completion by the second disc 25 of a full rotation, the third disc 26 makes a one-step advance rotation. The photoelectric elements may be solar cells or any suitable substitutes therefor which are responsive to the impinging light. The numbers of the discs, the lamps and other components of the means 10 may be increased or decreased as necessary.

As shown in FIG. 4*a* with reference to the disc 24 by way of example, each of the discs 24, 25 and 26 is provided in an identical manner with a plurality of small openings or holes 35 through which light emitted by the lamps 27, 28 and 29, passes as the case may be upon alignment of a particular hole 35 with its light source. Referring to FIG. 4*a*, there are shown 16 equally spaced phantom lines 36 through 51 extending radially from the center of the disc 24, and four circular phantom lines *a* through *d*. Each hole 35 is centered on one of the points of intersection between the phantom lines 36 through 51 and the circles 1*a* through *d*. There are a number of 'closed' intersections at which no hole 35 is provided. The pattern of 'closed' and open holes is tabulated in FIG. 4*b* which represents an open intersection by 0, and a closed one by 1. The 16 angular positions are uniquely encoded.

A portion of the circuit of the comparison signal generating means 10 is shown in FIG. 5. The bias voltage of a transistor 55 is determined by resistors 52, 53 and 54. When the light emitted from the lamps 27, 28 and 29 passes through a hole 35, and falls onto one of the cells 30*a* through 32*d*, a voltage variation is formed at the base to vary current flow through the transistor 55, and the transistor 55 becomes conductive. The output voltage between the emitter and the collector when the transistor is conductive is near zero volts. When the light to the solar cell is intercepted by the disc, the transistor 55 becomes non-conductive, and the voltage *Vc* of the power source is found at an output terminal. This action is represented by binary signals of 0 and 1, where 0 represents an output voltage of approximately 0 volts, and 1 the voltage of the power source. Since each of the discs 24 through 26 is associated with four solar cells (*a, b, c* and *d*), the comparison signal generating means 10 uses four circuits for each disc, or a total of 12 circuits.

The output signals from the comparison signal generating means 10 are shown in FIG. 6. The number of output signal combinations available is the cube of 16, or 4,096, with the aid of the means provided between two adjacent discs for shifting more significant discs by one step on rotation of the less significant disc. Thus, 4,096 frames or series of frames may be placed on a single roll of film if the signal generator is adpated to correspond in operational relation with the film transport sprocket means. Addition of one more disc allows for the fourth power of 16 incorporation of 65,536 frames in a single roll of film.

In case the image of interest is at frame number 1234, for example, a pulsed address signal which corresponds to $2^{10} + 2^7 + 2^6 + 2^4 + 2^1$ in binary code, and to 001001101001 in a series representation shown in FIG. 7, is transmitted from the computer 1 to the comparison circuit 3 (FIG. 1). The stepping motor 4 is rotated, and causes the film 13 to move. The mechanism of the comparison signal generating means 10 is also driven, and at the same time, an address signal corresponding to each film frame is generated, and this signal is also fed to the comparison circuit 3. The comparison circuit 3 compares the address designation signal from the computer 1 with the address signal from the comparison signal generating means 10. The comparison circuit 3 comprises, as shown in FIG. 8, a well-known coincidence circuit 56 and an AND gate 57. The coincidence circuit 56 comprises NOT gates 58 and 59, and AND gates 60, 61 and 62. An input terminal A receives an address designation from the computer 1, while an input terminal B receives an address signal from the comparison signal generating means 10. When both of the signals at the terminals A and B are in coincidence in the comparision circuit 3, the circuitry is in the state of 1, that is, on, and when not in coincidence, the circuitry is in the state of 0, that is, off.

There are provided 12 coincidence circuits corresponding to the signal generators 30*a'* through 32*d'* connected to the photoelectric elements 30*a* through 32*d* associated with the discs 24, 25 and 26. Each of these coincidence circuits receives from the computer 1 an output signal having a wave form as shown in FIG. 7. All the output signals from each coincidence circuit are fed to the AND gate 57, and the AND gate 57 produces an output level of 1, that is, "on," in case of coincidence of all the signals fed to the gate 57, but an output of "0," that is, "off" in all the other cases. When the AND gate 57 is "on," the output signal is applied to the pulse motor control means 6, and the pulse motor 4 is deenergized to stop.

Since the pulse motor 4 repeats the start and stop actions regulated by the signals received from the pulse motor control means 6, until the motor receives a signal 63 from the AND gate 57, and rotates through an angle proportional to the number of pulses, the motor 4 can be stopped accurately and promptly without any mechanical braking means. If the frequency of the pulses applied to the pulse motor 4 is set at an animated picture projection speed, it is possible to project a still image as a photographic stationary image if a particular frame on the film is selected, and a series of animated picture images in case a corresponding series of frames is selected.

Figure 9:
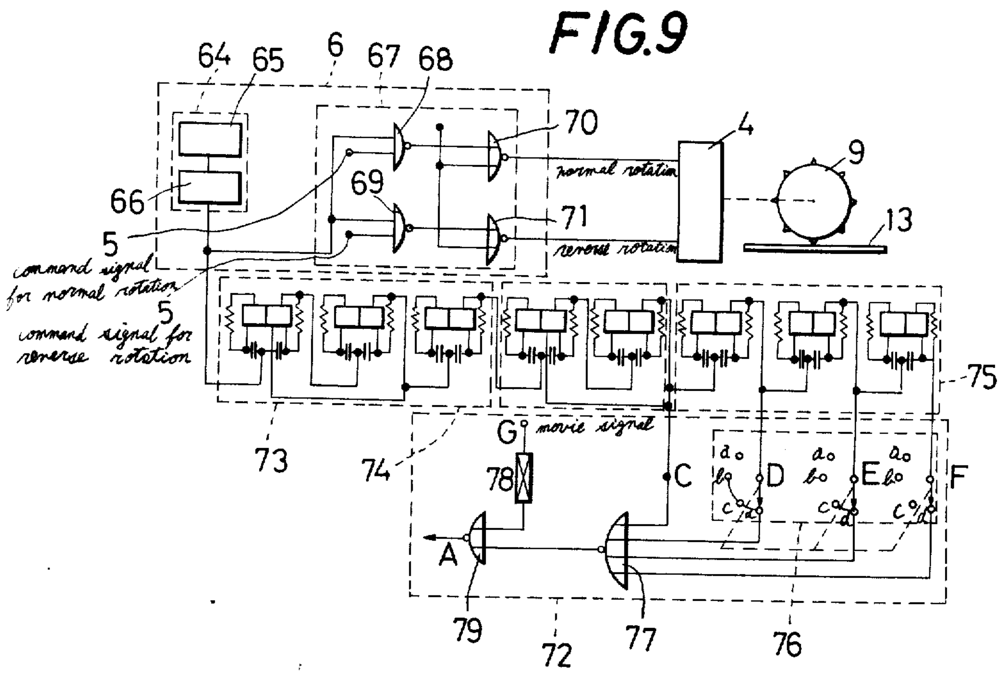
FIG. 9 is a schematic diagram, in block form, illustrating another embodiment of the invention including, in conjunction with the apparatus shown in FIG. 1, additional circuitry for selectively varying the film transport velocity.

The schematic diagram shown in a block form in FIG. 9 illustrates another embodiment of the invention, including additional circuitry for controlling the film transport speed which is added to the apparatus shown in FIG. 1, and which advances the film at a high speed or a slower speed until the designated frame is reached. A sine wave form is formed by an ordinary RC oscillator 65 in a pulse generating circuit 64 included in the motor control means 6, and the sine wave is converted into a square wave by a monostable multivibrator 66. A scale factor accommodating frame width, gear train ratio and number of degrees to a pulse in operation of the motor is required. For instance, one frame might require six pulses. The frequency of oscillation of the pulse generating circuit 64 is, therefore, selected to be 432 HZ for a film speed of 72 frames per second. Each pulse generated by the pulse generating circuit 64 is fed to a gate circuit 67 included in the pulse motor control means 6, and a counter circuit 72 which will by explained later. The pulses are transmitted to the successive NOR gates 70 and 71 only when a command signal indicative of the direction of rotation of the motor is given to a NAND gate 68 or 69.

The direction of rotation is indicated by a signal from the computer 1 over the conductor 5. The signal is selectively applied to the gates 68 and 69 to enable rotation in the forward or reverse directions. Pulses from the oscillator 64 thus are passed by one of the gates 68 and 69 to the gates 70 and 71. If an enable signal is applied to the gates 70 and 71, the motor is advanced or reversed on each pulse. Of course, a 1 applied to both the gates forms and holds a 0 at the output to stop the motor 4.

Since a scale factor may be required, the numeral 72 indentifies a counter circuit which accomplishes the scale conversion and speed variations. The pulses from the oscillator 64 after shaping are fed to counter circuit portions 73, 74 and 75. Different scale factors may require different arrangements in the counters 73, 74 and 75.

The arrangement shown in FIG. 9 can be used for high speed slowing to a particular frame and then slowed by changing the switch 76. When the apparatus is controlled in this mode, the signals from the gate 79 are input to the terminal A shown in FIG. 8. Of course, the coincidence circuit of FIG. 8 never counts to the desired point where a comparison is achieved the motor runs until stopped.

Referring to the above example of a scale factor of six, the counter circuit 73 is hexadic code counter comprising three flip-flop circuits. Six pulses entering this counter circuit cause the film to advance by one frame by counting through six and forming one output pulse. This number of pulses is adjustable according to the performance of the pulse motor 4 and the film advancing speed; for example, the number of the output pulses of the pulse generating circuit 64 is divided by six to correspond to the number of the frames on the film. The output signal of the hexadic code counter 73 is an input signal to a ternary counter 74, and the output signal of the ternary counter 74 is an input signal to a binary counter 75. The construction of the counters 74 and 75 is determined according to the scale factor. For example, when the film advance is 72 frames per second, the pulse rate at the output terminal C of the ternary counter 74 corresponds to 24 frames per second, which is a standard speed for motion pictures with sound, and the speed at each output terminal D, E, and F of the binary counter 75 is 12, six and three frames per second respectively.

A rotary switch 76 of the animated picture film transport control circuit 72 selects the output signal from the output terminals C, D, E and F of each counter, and selects tthe film advancing speed. When the rotary switch 76 is set to the position a, the outputs C, D, E and F of the counter actuate a NOR gate 77 of the film transport control circuit 72. In case all the outputs C, D, E and F are 0, the output of the NOR gate 77 is 1, which causes the film to advance at a rate of three frames per second. Similarly, when the rotary switch 76 is set to the positions b, c and d, the outputs of the circuit 77 cause the film to advance at a rate of six, 12 and 24 frames per second respectively.

The film transport control circuit 72 composed of a NOT gate 78 and a NOR gate 79 causes scaling only when it has received an animation signal from the computer 1 at its input terminal G. When no animation signal is received at the terminal G, namely, when the input signal at the terminal G is 0, the output signal at the terminal A is O, and no scaling occurs, but a high speed film transport is performed because the NOR gate 78 generates an output signal of 1.

Figure 10:
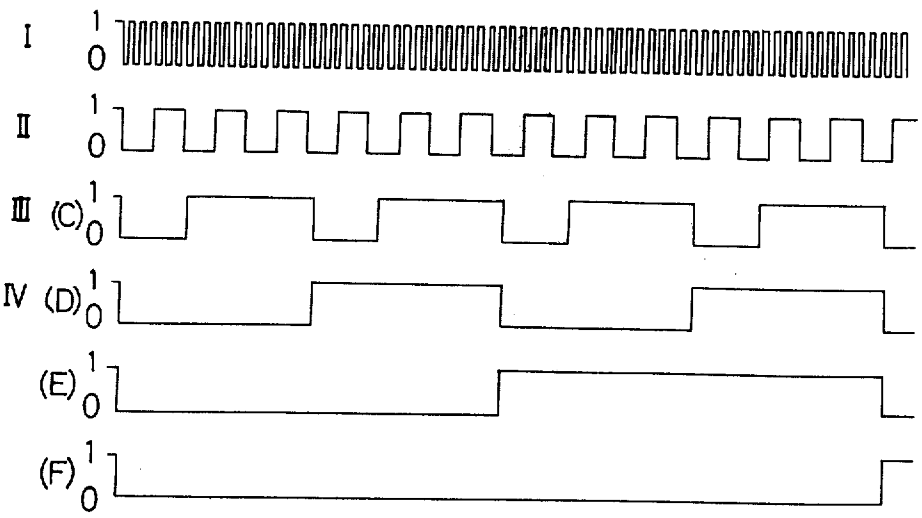
FIG. 10 is a view illustrating the wave forms of various output signals from the circuitry shown in FIG. 9.

The wave forms of various output signals generated by the circuitry shown in FIG. 9 are shown in FIG. 10. The wave form I shows an output signal from the pulse generating circuit 64; the wave form II shows an output at the terminal A of the hexadic counter 73; the wave form III shows a signal at the output terminal C of the ternary counter 74; and the wave forms IV show the signals at the output terminals D, E, and F, respectively, of the binary counter 75.

It will be apparent from the foregoing description that the apparatus according to this invention will conveniently be used for a selective projection of still images or animated picture images from a single roll of film by selectively advancing or stopping the film by sprocket means connected to a pulse motor selectively energized or deenergized as a direct current power supply to a pulse motor control circuit is switched on or off in response to the output pulse from a gate circuit.

One suitable form of pulse motor 4 is made by the Superior Manufacturing Corporation and sold under the trade name "Slo-Syn." It steps 1.8° per step. It dynamically holds the stopped position to avoid brake mechanism. That firm also supplies driving circuits which can be varied in speed and direction. Other stepping motors can be readily used.

Many alterations and variations in the present invention may be incorporated, but the scope thereof is determined by the claims which are as follows.

We claim:

1. In a projector adapted for selective reproduction of the image or images placed in a particular frame or series of frames on a strip of film, the improvement comprising:
- means for transporting the film including means for engaging the film;
- incremental Motion pulse operated motor means for driving said film transport means;
- circuit means for controlling the operation of said motor means;
- means for generating a binary coded comparison signal corresponding to a particular frame of the film;
- means for generating a command signal indicative of a particular frame bearing a particular image to be reproduced;
- and comparison circuitry means for comparing said comparison signal with said command signal, and for forming a pulse operating signal for said motor means until coincidence of said two signals.

2. The projector as defined in claim 1, wherein said comparison signal generating means comprises;
- a disc adapted to be rotated at a fixed speed relative to the movement of the film, said disc having a plurality of means thereon for generating binary signals;
- and a means cooperative with the means on said disc and including a circuit means for forming binary signals indicative of the rotation of said disc.

3. The projector as defined in claim 1, wherein said comparison circuitry means comprises:
- a first AND gate adapted to receive said comparison signal and said command signal at the input terminals thereof;
- a second AND gate adapted to receive said comparison signal and said command signal through a pair of NOT gates:
- a third AND gate adapted to receive the output signals of said first and second AND gates at the input terminals thereof;
- and a fourth AND gate adapted to receive the output signal of said third AND gate, and transmit a control signal to said motor control means.

4. The projector as defined in claim 2, wherein said disc is formed with holes in such a manner that the number of the pattern of the binary signals is equal to 16 multiplied by any integer.

5. The projector as defined in claim 4 wherein said holes of said disc are centered on the points of intersection between a plurality of concentric circles and a plurality of straight lines radially extending from the center of said concentric circles with equal angles therebetween.

6. The projector as defined in claim 1 wherein said motor control means comprises:
- a circuit for generating pulses for operating said motor means;

and gate means adapted to regulate the flow of pulses, and a signal responsive means which controls the direction of rotation of said motor means such that the direction of transport of said film is controlled.

7. The projector as defined in claim 6 wherein said gate means comprises a pair of NAND gates selectively adapted to transmit an output signal to the corresponding one of a pair of NOR gates provided ahead of said NAND gate only when said signal indicative of the direction of rotation of said motor means has been applied thereto.

8. The projector as defined in claim 6, further including counter means for converting the frequency of the oscillations of the pulses, and a circuit adapted for selectively controlling the film transport speed.

9. The projector as defined in claim 8 wherein said counter means comprises a plurality of flip-flop circuits selectively connected in series.

10. The projector as defined in claim 8, wherein said film transport speed control circuit comprises:

a first NOR gate adapted to receive the output signals from said counter means through switch means provided for varying the film transport speed; and a second NOR gate adapted to receive the output signal from said first NOR gate and an animation signal denied through a NOT gate, and transmit an output signal to be applied to said pulse motor control means.

11. The projector as defined in claim 7, wherein said counter means including connected hexadic, ternary and binary counters adapted to scale the frequency of the pulses for selective reproduction of said images by causing the film to move at various speeds.

* * * * *